United States Patent [19]

Kitamura

[11] 4,135,278

[45] Jan. 23, 1979

[54] AUTOMATIC TOOL CHANGING DEVICE FOR A MACHINING CENTER

[76] Inventor: Koichiro Kitamura, 11-5 Ekinan-3-chome, Takaoka, Japan

[21] Appl. No.: 817,529

[22] Filed: Jul. 19, 1977

[30] Foreign Application Priority Data

Jul. 27, 1976 [JP] Japan .................................. 51-89327

[51] Int. Cl.² .............................................. B23Q 3/157
[52] U.S. Cl. ..................................... 29/26 A; 29/568; 408/35
[58] Field of Search .................. 29/568, 26 A; 408/35

[56] References Cited

U.S. PATENT DOCUMENTS

| | | | |
|---|---|---|---|
| 3,271,853 | 9/1966 | Pfister | 29/568 |
| 3,406,607 | 10/1968 | Hill | 29/26 A X |
| 3,473,419 | 10/1969 | Ollearo | 29/26 A X |
| 3,719,977 | 3/1973 | Fantoni | 29/26 A |

Primary Examiner—Gil Weidenfeld
Attorney, Agent, or Firm—Haseltine, Lake, & Waters

[57] ABSTRACT

An automatic tool changing device includes a frusto-conically shaped tool holder holding a large number of machining tools and mounted on the forward end of the head of a machining center so as to be vertically movable and rotatable about a non-rotating shaft which is slanted downwardly, whereby by rotating the tool holder, the desired tool can be automatically and sequentially attached to the cutter head spindle of the machining center, used to machine a work and then removed so that the next tool can be attached to the cutter head spindle.

4 Claims, 8 Drawing Figures

AUTOMATIC TOOL CHANGING DEVICE FOR A MACHINING CENTER

BACKGROUND OF THE INVENTION

The present invention relates to an automatic tool changing device for machining centers such as a numerical control milling machine with an automatic tool changing device. on of Two principal types of such device are known in the art, namely, a turret head type, and an arm type in which the necessary tool changes are accomplished by means of an arm and tool transport unit, such as, a robot which is arranged between a tool magazine and the spindle of a machine tool. A disadvantage of the turret head type is that while the tool changing time is relatively short, the number of tools that can be held of the head is usually on the order of 6 to 8 tools thus making it unsuitable for use on machining centers designed to handle a wide range of machining operations, and moreover there is the disadvantage of causing indexing errors, misalignment and the like. The latter arm type is also disadvantageous in that since the tool holding head must first be raised to a predetermined height to permit the tool change by the robot and then the head must be lowered to permit the machining of the work, even in the case of a small-sized work, the head must be raised to such predetermined height thus requiring a dead time, waste time in changing the tools, unavoidably making the device large and complicated in construction and making it impossible to use this type of device on machining centers in view of the recent trend in designing toward smaller machining centers.

SUMMARY OF THE INVENTION

With a view to overcoming the foregoing difficulty, it is an object of the present invention to provide an improved automatic tool changing device for machining centers.

To achieve this object, the improved device provided in accordance with the present invention is so designed that a large number of tools can be held in such a manner that the tool change may be accomplished at a position nearest to the work without any possibility of interference with the work, thus reducing the tool changing time and ensuring more accurate indexing of tools.

It is a further object of the present invention to provide an improved automatic tool changing device which is smaller and more compact so that the tool indexing and changing operations can be accomplished by means of only one revolution of a rotary shaft.

It is still further object of the present invention to provide an improved automatic tool changing device which is so designed that the tools can be positively held in positions which are free from interference with a piece of work both before and after their use.

These and further objects and advantages of this invention will become apparent from the following more detailed description of an illustrative embodiment of the invention, which will now be given in conjunction with the accompanying drawings.

DESCRIPTION OF THE PREFERRED EMBODIMENT

The present invention will now be described in greater detail with reference to the illustrated embodiment.

Figure 1:
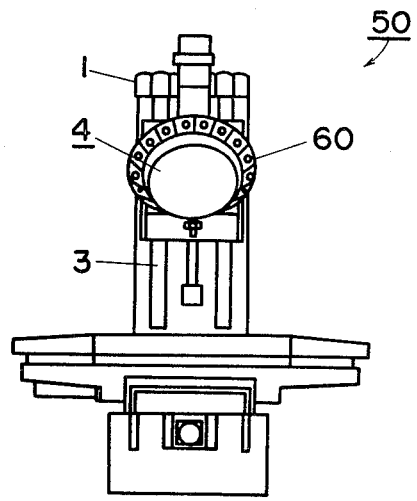
FIG. 1 is a front view of an automatic tool changing device according to the invention, showing the device mounted on a machining center.
Figure 2:
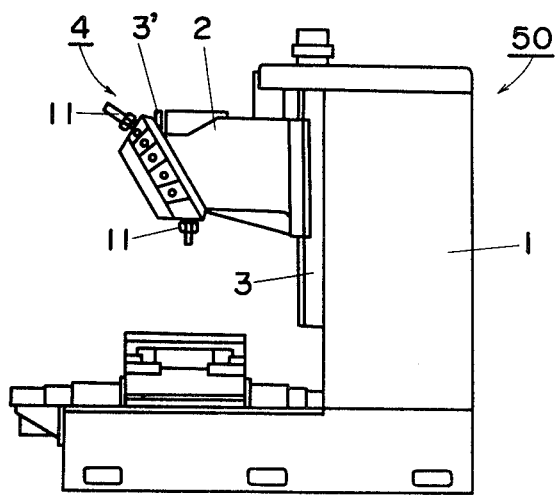
FIG. 2 is a side view of the apparatus illustrated in FIG. 1.
Figure 3:
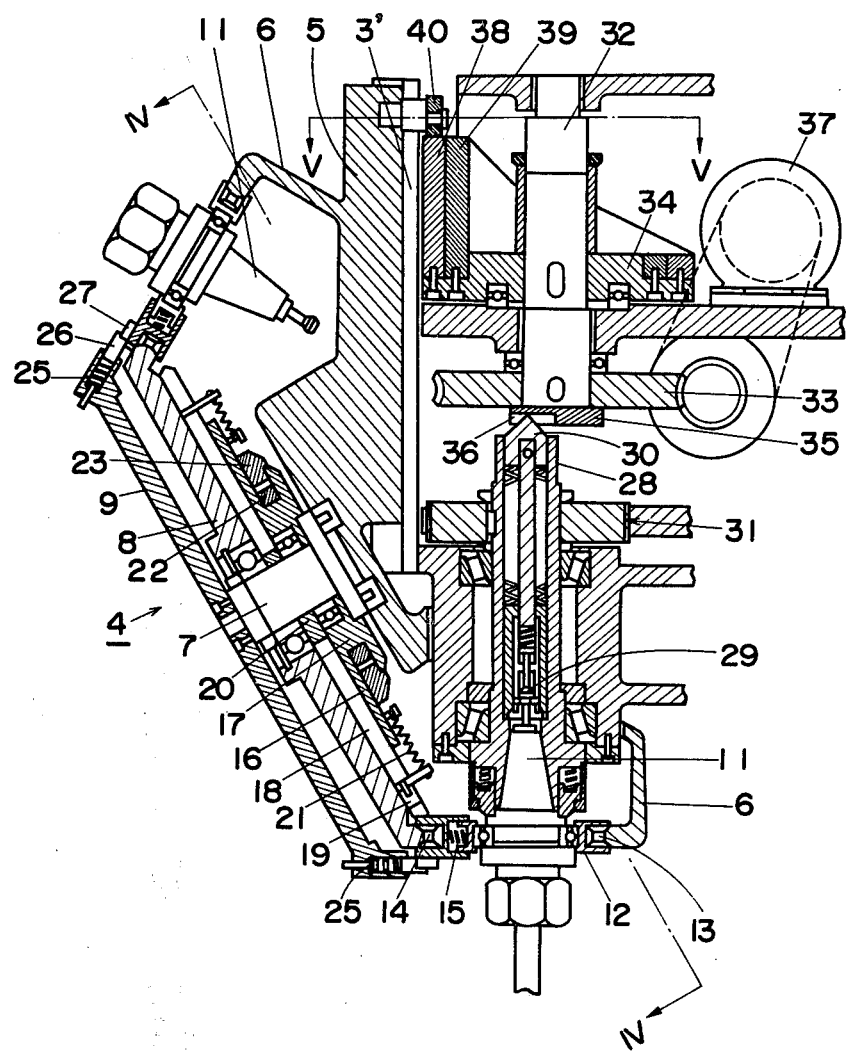
FIG. 3 is a sectional view of the device shown in FIG. 1.

Referring now to FIGS. 1 and 2, there is shown a machining center 50 equipped with an automatic tool changing device 60 of this invention. In the Figures, a head 2 is vertically movably mounted on a pair of guide rails 3 on the front part of a column 1, and a rotary tool rack 4 comprises a rack base 5 adapted to be vertically guided by a pair of guide rails 3' on the front part of the head 2, and a frustoconical casing 6 integral with the base 5. Referring to FIG. 3, there are shown, a disk 8 rotatably mounted on a fixed shaft 7 projecting from the central portion of the base 5 to slant downwardly, a front wall portion 9 fixedly mount-on the outer end of the fixed shaft 7 to form the front part of the rack, an annular channel 10 defined between the peripheral portions of the casing 6 and the disk 8, and a large number of movable plates 12 received in the annular channel 10 and each being adapted to rotatably hold a tool holding arbor 11.

Each movable plate 12 is provided at one end with a roller 13 to contact the peripheral portion of the casing 6 and at its other end with a roller holder 14 fitted thereon through a spring 15 with the roller of the holder 14 being placed in contact with the peripheral portion of the disk 8. In this case, one of a large number of the arbors 11 is located on the lower side of the casing 6 and the remaining arbors 11 are continuously arranged along the upper peripheral portion on both sides of the lower arbor 11 with a predetermined angle therebetween. This predetermined angle must be in such a range that the tools which are not in use are free of interference with the work, and the angle is 60° in the illustration. The shank of the arbor 11 positioned on the lower side of the casing 6 is inserted in the shank socket in the lower end of an upright cutter head spindle 28 in the head 2, and the machining is effected by the tool attached to the lower arbor 11.

Figure 4:
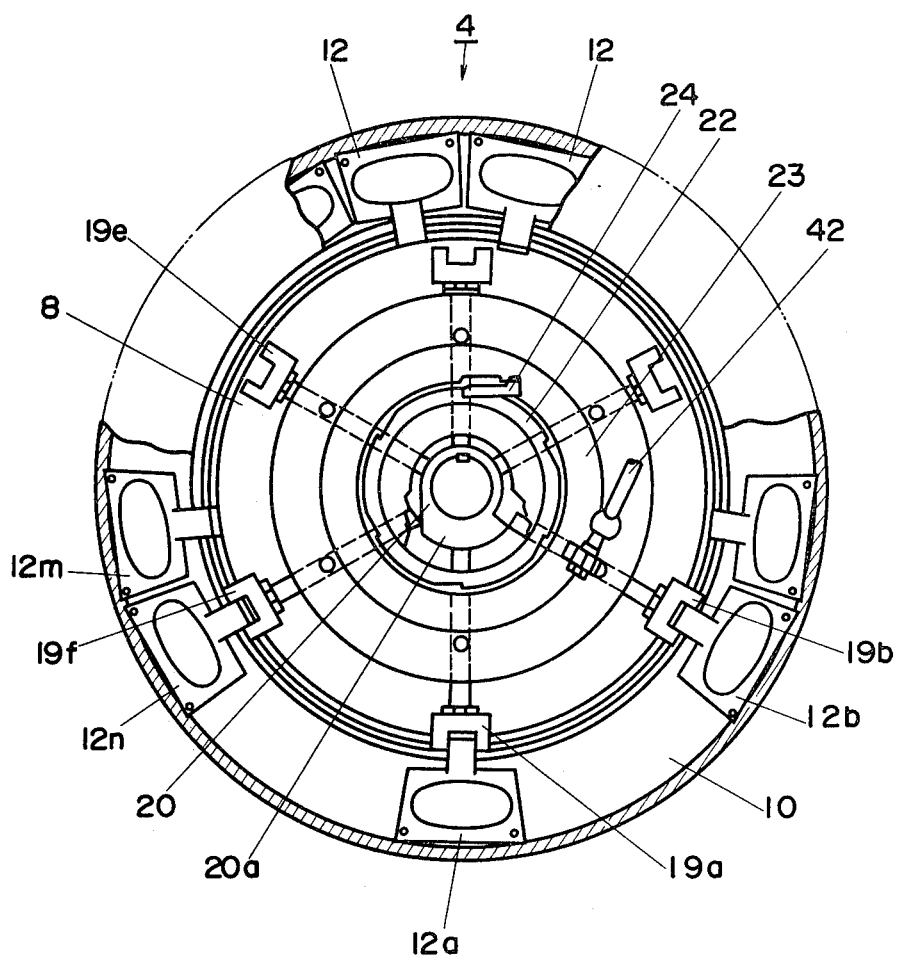
FIG. 4 is a view partially in section of the rotary tool rack as taken along line IV — IV in FIG. 3.

To suitably arrange the arbors 11, as shown in FIGS. 3 and 4, the back surface of the disk 8 is formed with a plurality of radial open channels (six channels in the illustrated embodiment) and said back surface is covered by a disc 16 integrally formed with a hollow shaft 17 having a flange, the hollow shaft being positioned in the central part of disc 16 thus providing a plurality of covered channels into which bars 18 are radially and slidably fitted. Fixedly mounted at the outer end of each bar 18 is a C-shaped carrier 19 fitted on the roller holder 14 of the movable plate 12. A cam 20 having a raised portion 20a is fixed non-rotatably on shaft 7 in a manner so that face 20a is positioned at the lower side of the shaft, and each bar 18 is forced toward cam 20 by the action of respective springs 21. Thus, the carrier 19 can approach the roller holder 14 by the action of the cam 20, and the movable plate 12a is supported by the carrier 19a positioned at the lower side of the casing 6 due to contact of the movable plate with the surface 20a of the cam 20 through the bar 18, and the carriers 19b and 19f positioned at both sides of carrier 19a are constructed so as to be supported at angularly spaced positions from carrier 19a of 60°. A ratchet wheel 22 is fitted non-rotatably on the hollow shaft 17 of the disk 8 so that each tooth of the ratchet wheel will correspond with a respective bar 18. An outer wheel 23 is fitted rotatably in the space between the flange of the hollow shaft 17 and the disk 16 around the outer portion of the hollow shaft. The disk 8 is rotated by pawls 24 engaged with the ratchet wheel 22 and rotated by outer wheel 23 as described later. The front wall 9 fixedly mounted on the fixed shaft 7 is provided at the outer periphery thereof with a plurality of notches 25 with springs which are placed in positions corresponding to the carriers 19. Fitted in each notch 25 is a supporting piece 26 with a V-groove, and each of the roller holders 14 is provided with a projection 27 adapted to fit in the V-groove. In this way, the positions of the arbors 11 can be accurately maintained by means of the notches 25.

On the other hand, the arbor 11 located on the lower side of the rotary tool rack 4, is fitted in the lowermost shank socket in the cutter head spindle 28 of the head 2 and is held by a chuck 29 disposed above the shank socket. The chuck 29 is designed so that when a spindle head 30 having a conical upper part and upwardly biased by a pan spring applies a downwardly pressing force through a cam plate 35 and the spindle, the chuck 29 is opened and it clamps the arbor in response to the return motion of the spindle head 30. The cutter head spindle 28 is provided with a rotary motion transmission unit 31 which may comprise a gearing or the like.

Figure 5:
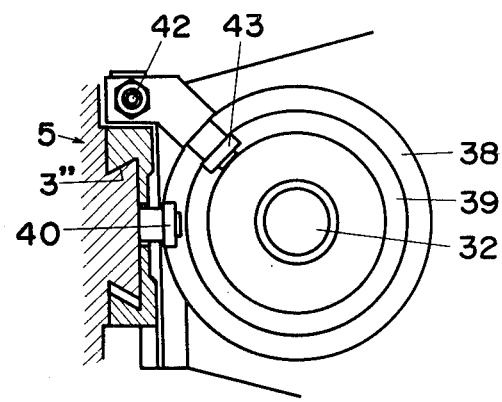
FIG. 5 is a view partially in section of the cylindrical cam mount as taken along line V — V in FIG. 3.
Figure 6:
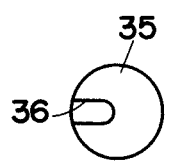
FIG. 6 is a plan view of the chuck control cam.
Figure 7:
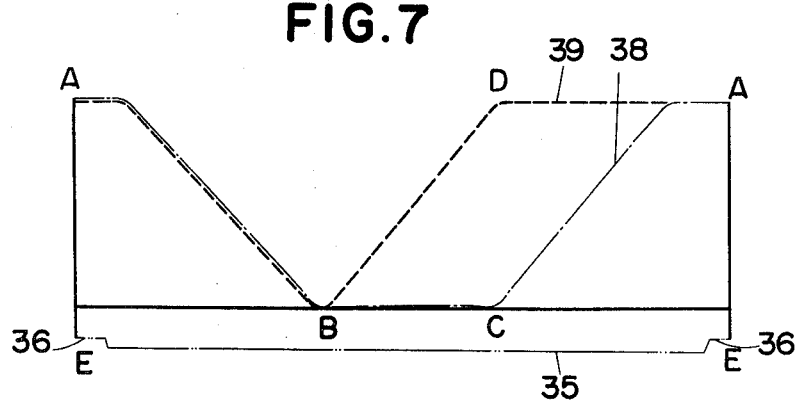
FIG. 7 is a graph showing in developed form the relationship of the cylindrical cams and the chuck control cam relative to another.

The structure for engaging and disengaging the arbors 11 with the cutter head spindle 28 includes a rotary shaft 32 disposed above the cutter head spindle 28 in the head 2 so as to be slightly offset from the central axis of the cutter head spindle 28 to extend parallel therewith, a reduction gear 33 and a supporting plate 34 which are mounted on a rotary shaft 32, the chuck control cam 35 fixedly attached to the lower end of the shaft 32, and a motor 37 disposed in the head 2, whereby the driving force of the motor 37 is transmitted at a reduced speed to drive the rotary shaft 32. The chuck control cam 35 consists of a disk against the lower surface of which is pressed the spindle head 30 disposed at the upper end of the chuck 29. Also the cam 35 is formed with a depression 36 in a portion of the path of contact with the spindle head 30 so that the arbor 11 is held when the spindle head 30 is in engagement with the depression 36, and the arbor 11 is released when the spindle head 30 comes out of engagement with the depression 36. The supporting plate 34 is provided with a pair of cylindrical cams 38 and 39 which are fixedly mounted concentrically thereon, so that the outer cylindrical cam 38 vertically moves the rotary tool rack 4, and the inner cylindrical cam 39 rotates the disk 8 through a desired angle. The relationship of the cylindrical cams 38 and 39 and the chuck control cam 35 to one another is shown in developed form in FIG. 7, namely, as shown by the one-dot-chain line, the outer cylindrical cam 38 has a slope which gradually descends from a highest position A toward a lowest position B and again returns to the highest position A from a position C spaced from the lowest position B, and the cam 38 is in engagement with a roller 40 projecting from the base 5 of the tool rack 4, as shown in FIG. 5. Also, as shown by the dotted line in the Figure, the inner cylindrical cam 39 is formed so that while its slope descends from the highest position A toward the lowest position B as in the case of the outer cam 38, the slope immediately ascends with a gradient toward a highest position D from which the slope returns to the original position A. On the other hand, as shown by the two-dot-chain line, the chuck control cam 35 is so formed that the spindle head 30 is raised at each of positions E opposite to the highest positions A and lowered between the positions E.

Figure 8:
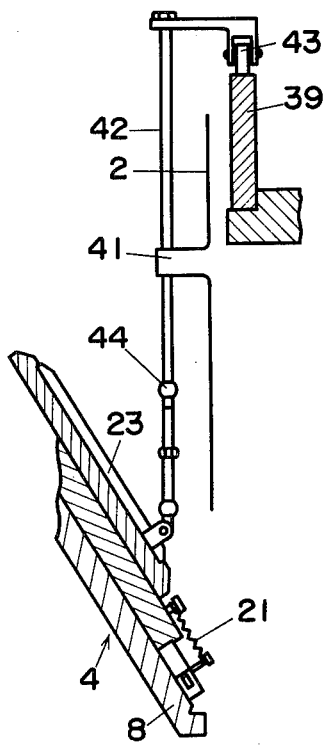
FIG. 8 is a sectional view showing the operative association between the disk and the inner cylindrical cam.

As is shown in FIG. 8, the structure for rotating the disk 8 by the inner cylindrical cam 39 includes a rod 42 vertically movably supported by a bracket 41 extending from the head 2 and provided at its upper end with a roller 43 disposed to contact the inner cylindrical cam 39, and the lower end of the rod 42 is coupled through a universal joint 44 to the outer wheel 23 mounted on the disk 8.

With the construction described above, the device of this invention operates as follows. When it is desired to change the tools, the head 2 is first raised to a position where the tools are free of interference with the work during the tool changing operation, and the motor 37 is operated to complete the tool change during one revolution of the rotary shaft 32. As the shaft 32 is rotated, the spindle head 30 of the cutter head spindle 28 is first lowered by the chuck control cam 35 so that the grip on the arbor 11 is released, and at the same time the rotary tool rack 4 is lowered by the outer cylindrical cam 38 thus withdrawing the arbor 11 from the taper shank at the lower end of the cutter head spindle 28. At the same time that the rotary tool rack 4 is lowered, the rod 42 is lowered by the inner cylindrical cam 39 until it reaches a lowest position and then the rod starts to raise. Thus, the rod 42 raises in advance while the rotary tool rack 4 is stopped at the lowest position by the outer cylindrical cam, and the disk 8 is rotated through a predetermined angle (60° to the right in the illustrated embodiment). Consequently, as shown in FIG. 4, the carrier 19a with its arbor 11 is moved to the position where the carrier 19b previously was, and the carrier 19f is moved, along with the arbor 11 engaged therewith, to the position where the carrier 19a previously was. Then the rotary tool rack 4 is raised so that the taper shank of the next arbor 11 to be used is inserted into the shank socket of the cutter head spindle 28, and at the same time the head 30 is raised by the chuck control cam 35, thus causing the arbor 11 to be firmly held by the chuck 29.

The movement of the respective arbors 11 and carriers 19 made in response to the rotation of the disk 8 by the rod 42 will now be described in greater detail. When the carrier 19a located on the lower side in the illustration is moved 60° to the right along with the movable plate 12 engaged therewith, the carrier 19b is moved simultaneously. In this case, however, the carrier 19b is retracted toward the center of the disk 8 due to the disengagement of the bar 19 from the surface 20a of the cam 20 so that the carrier 19b is disengaged with the movable plate 12b and it is rotated as such, thus causing the movable plate 12b to remain in its position. However, the movable plate 12a now being moved strikes against and displaces the movable plate 12b. On the other hand, the movable plate 12n located on the left side in the illustration is engaged with the carrier 19f and has moved downwardly therewith. At the same time, a carrier 19e is moved to the position where the carrier 19f previously was, so that the carrier 19e is pushed by the cam 20 toward the outer periphery of the disk 8 and it is thus engaged with a movable plate 12m adjoining a movable plate 12n. Consequently, the carrier 19e stands by at the position where the movable plate 12n previously was. The notches 25 ensure accurate positioning of the movable plates 12 which engage with the carriers 19. Thereafter, the head 2 is lowered and the desired machining of the work is accomplished.

It will thus be seen from the foregoing description that the automatic tool changing device of the present invention has among its great advantages the fact that the outer peripheral surface of a rotary tool rack is formed with an annular channel with which a large number of arbors are rotatably engaged, and the arbors are arranged in such a manner that one of the arbors is engaged with the cutter head spindle of a head and the arbors on both sides of the engaged arbor are held in positions which are free of interference with the work to be machined, thus making it possible to continuously arrange the remaining arbors between the two arbors in the non-interferring positions and thereby hold a large number of tools.

Another advantage of the device of this invention is that to make the tool change, after the head has been raised, the rotary tool rack is lowered thereby withdrawing the arbor from the cutter spindle, and after the disk disposed in the tool rack has been rotated through a predetermined angle, the tool rack is again raised thereby engaging the next arbor with the cutter spindle thus ensuring rapid tool changes, and moreover the fact that these operations can be accomplished by a pair of concentrically arranged cylindrical cams adapted to be rotated by a single rotary shaft has the effect of making the device relatively simple and compact in construction and also considerably reducing, in the case of small works, the time required for making the tool change and commencing the machining by the next tool since it is only necessary to raise the head to such an extent that the tools are free from contact with the work when the tool rack which was lowered to withdraw the tool from the cutter head spindle is raised again.

Still another advantage is that with the arbor engaged with the cutter head spindle and the arbors located on both sides of the engaged arbor so as to be free from interference with the work, in the course of the machining by the tool there is no danger of the other arbors carrying the tools slipping off and a very high degree of operating safety is ensured, since the disk is provided with a plurality of equally spaced carriers adapted to engage with a plurality of movable plates adapted to support the arbors and movable from the center of the disk toward and away from the outer periphery thereof, and a cam is mounted on a fixed shaft supporting the disk so as to move the carriers forward and backward and thereby hold the movable plates of the above-mentioned three arbors.

Still another advantage is that by virtue of the fact that a rod is vertically moved by an inner cylindrical cam and its upward movement if transmitted through a ratchet mechanism to cause a predetermined degrees of rotation of the disk, there is no danger of the disk being rotated in the reverse direction but the disk can be positively rotated through a predetermined angle each time, thereby indexing and moving the arbors to the proper positions.

What is claimed is:

1. In an automatic tool changing device for a machining center having a bed, a table for workpieces, a column, a movable head, a cutter head and a tool rack, the improvement comprising:

said tool rack including a rack base, and a casing integral with said rack base, said casing having a peripheral portion guide rail means on said movable head for guidable displacement of said rack base, a fixed shaft projecting from said rack base, a disk rotatably mounted on said fixed shaft and having a peripheral portion defining an annular channel with the peripheral portion of said casing, a plurality of movable plates received in said annular channel for movement along the edge of said annular channel, each of said movable plates being adapted to rotatably hold a tool holding arbor, and means for maintaining a predetermined angle between the movable plate in the lowest position of said annular channel and the movable plates located on both sides of said movable plate in the lowest position;

a cutter head spindle having a lowermost portion with a socket for receiving the shank of each said arbor and chuck means in said spindle adapted to be opened and closed for firmly holding a forward end of each said arbor, drive means for driving said cutter head spindle at reduced speed; and a ratchet means for rotating said tool rack through said pre-determined angle, means for opening and closing said chuck means, means for vertically moving said rotary tool rack to remove said tool arbor from said cutter head spindle and insert another of said tool arbors into said cutter head spindle, a cam mechanism including a first cam operatively associated with said ratchet means, a second cam operatively associated with said means for opening and closing said chuck means in said cutter head spindle, a third cam operatively associated with said means for vertically moving said rotary tool rack and driven cam shaft means operatively associated with said cams for controlling the operation thereof and of the timing of the respective means associated with said cams in the course of one revolution of the cam shaft means.

2. The improvement as claimed in claim 1 further comprising means for locking the movable plate in the lowermost position, said first cam being operatively associated with the locking means for activating the same with the movable plate in the lowermost position.

3. The improvement as claimed in claim 2 wherein said locking means comprises a displaceable locking bar actuated by the first cam to lock the movable plate in the lowermost position.

4. The improvement as claimed in claim 1 comprising roller means on each said plate rotatably supporting said plate from the rack base and casing.

* * * * *